Patented Feb. 12, 1929.

1,701,703

UNITED STATES PATENT OFFICE.

JOEL STARRELS, OF CHICAGO, ILLINOIS.

MANUFACTURE OF HIGH-GRADE SOAPS FROM LOW-GRADE FATS.

No Drawing.   Application filed October 15, 1923.   Serial No. 668,497.

The present invention relates to the manufacture of high grade soaps from low grade fats.

The present invention relates in certain of its phases to the production of light colored neutral soap but as the description proceeds it will be clear that the process constituting the subject-matter of the present invention is also of decided advantage in the production of lubricants.

At the present time, in order to produce neutral soaps, light in color, it is necessary to use high grade fats which are light in color, or which can be bleached to a very light color. Such fats are relatively high in prices and are low in free fatty acid. Dark colored fats such as "brown grease" and "cotton seed oil foots" are at present utilized in the manufacture of filled soaps, i. e., soaps which contain a certain amount of sodium silicate as a filler. According to present practice, such dark colored fats or cotton seed foots are subjected to a fat splitting process which decomposes the glycerides, and the fatty acids are then distilled. These distilled fatty acids cannot be used in the manufacture of light colored neutral soaps for the reason that the soaps made from such material will not remain light in color unless an excess of alkali or filler like sodium silicate be present. Furthermore, the distillation of fatty acids requires a relatively high temperature which entails a considerable loss of material in the formation of tar or pitch in the stills, brought about by the decomposition or breaking down of the fatty acids under such high temperature.

An object of the present invention is to provide a method of treating low grade fats which will so stabilize the same that they can be handled without danger of breaking down.

A further object is to provide a method of treating low grade fats which will produce a viscous oil light in color and low in free fatty acid.

A further object is to provide a method of handling low grade fats which will produce a non-gumming oil and which is valuable as a lubricant and as a burning oil.

A further object is to provide a method of treating low grade fats whereby neutral soaps may be produced which are stable and remain light in color.

According to the present invention, dark colored low grade fats, which are high in free fatty acids are esterified. Esterification may be preceded by a process of separating the glycerine from the fatty acids, as for instance, by the Twitchell or by the autoclaving process. The fatty acids resulting from such process may then be esterified by causing them to combine with alcohol, the alcohol taking the place of the glycerine in the original fats; or if preferred, the dark colored fats high in free fatty acid, may be treated with alcohol and esterified directly without the preliminary fat splitting.

Esterification may be carried out by adding an amount of alcohol in excess of the theoretical amount necessary to completely esterify the fatty acids present in the presence of a catalyst. I have found that 1% to 2% of concentrated sulphuric acid will act satisfactorily as a catalyzer in causing esterification. If preferred, hydro-chloric acid or hydrochloric acid plus calcium chloride may be used as the catalyst. Either methyl or ethyl alcohol may be used in the process of esterification, because of their relatively low cost and low boiling points, though other alcohols may be utilized. In the esterification process, the mixture referred to is heated to a temperature sufficient to vaporize the alcohol and preferably mechanically agitated. The resulting vapors are preferably passed through a reflux condenser or column still.

Passing the vapors through a fractionating column helps to separate the water from the alcohol, the water being discarded and the alcohol returned to the reaction vessel. The removal of the water aids the reaction and shortens the time necessary for the completion of the reaction. When, as referred to above, glycerides are being esterified, the glycerine is liberated, which remains in the reaction vessel and must later be removed. Such removal may be accomplished by the addition of water. The glycerine and water form a solution known in the art as "sweet water." The separation of the esters from the "sweet water" may be carried out in the manner well known in the art.

When esterification has been completed and the free fatty acid reduced to a small amount, as for instance, 1% to 2%, the mineral acid is removed and the last traces neutralized; the remaining esters are then freed from excess alcohol. After having been freed from all excess alcohol, the esters are distilled under vacuum. The distillation may be carried out in the presence of superheated steam, if desired, though this should be very carefully done if a low free fatty acid content is required in the distillate. The presence of any moisture at an elevated temperature would tend to split the esters.

As is well known, when fatty acids are distilled there is a tar loss of considerable proportion due to the neutral fat usually present in the fatty acid and due further to the decomposition of the fatty acids themselves at the high temperature required for distillation. The esters on the other hand, distill at a much lower temperature and loss due to decomposition is low.

The distilled esters are used in the manufacture of light colored neutral soaps by saponification with caustic in the usual way. In case it is desired to recover the liberated alcohol, the saponification will be carried on in a closed vessel and the alcohol removed, preferably under vacuum, and condensed. The esters saponify completely and much more quickly than the glycerides. A considerable saving of time and steam is thus accomplished by the present invention. Complete saponification is highly desirable.

When the original fat contains material of a high iodine number, such as may be present in cotton seed foots, it may be preferred to subject the distilled esters to a partial hydrogenation whereby the more highly unsaturated esters are reduced in iodine number. The finished esters would then have an iodine number equal to that of good tallow. This prevents oxidation in the finished soap and permits a stable light colored neutral soap to be produced.

The esters have a much lower melting point than their corresponding glycerides. The distilled esters may be used with advantage in place of tallow or lard oil or may be mixed with either of them advantageously.

A further decided advantage lies in the fact that though the original fat may have drying properties, the esters produced according to the present invention will not have these drying properties and will not have a tendency to gum.

The esters produced according to the present process have a decidedly less tendency to polymerize than do the corresponding glycerides.

The present invention presents the advantage that high grade light colored oils and soaps may be produced from the cheapest and poorest grades of fat. Moreover, saponification is carried out more efficiently and quickly than has heretofore been possible by reason of the fact that the present process involves the presence of alcohol which is liberated from the esters during the saponification process.

As a specific example of the application of the present invention, 100 pounds of dark color, low grade fats which are high in free fatty acids are mixed with 100 pounds of methylalcohol containing 2% of sulphuric acid. The mixture is heated to the boiling point of the alcohol and is preferably mechanically agitated and the vapors are passed through a reflux condenser or a fractionating column. When the esterfication has been substantially completed so that the free fatty acid of the mixture is about 2%, the mixture is allowed to settle and the acid layer drawn off at the bottom. The esters are then treated with barium carbonate or other alkali to neutralize the free acid. They are then washed with water in order to remove the glycerine and the excess of alcohol. The esters are heated to remove the last traces of free alcohol and are then transferred to a still. The distillation of the esters takes place under vacuum and superheated steam. The temperature does not have to exceed 225 degrees centigrade. The distillation commences at 160 degrees centigrade, and constant temperature is maintained as long as distillate is produced at the particular temperature. The impurities contained in the original fat remain in the still and the pure esters which have been distilled are now ready for use in the soap making art in place of tallow or other fats.

When the original fat contains a materially high iodine number such as may be present in cottonseed foots, the distilled esters are placed in a hydrogenation vessel, to which has been added one-half per cent of nickel catalyzer, which has been produced in one of the known ways, and the mixture is heated, in the presence of hydrogen, at a pressure of 50 to 75 pounds per square inch, to a temperature of 180 degrees centigrade. The mixture is heated under this pressure until the iodine number is approximately 40. The mixture is then cooled to around 150 degrees Fahrenheit, and then filtered from the catalyzer. The filtered esters can now be used in the soap making art in place of tallow or other fats in the usual manner.

It is suggested that the original low grade fat might be first subjected to a Twitchell or autoclave process and the resultant fatty acids then esterified. The resulting esters will be treated as above outlined.

The present invention has been described in considerable detail in order that those skilled in the art may readily understand the same, but the various steps will be subject to considerable modification without departing from the spirit of the invention. It is intended in this patent to cover all such modifications that fall within the scope of the appended claims.

What is claimed is:

1. The process of making soap from low grade fats containing material of high iodine number which consists in converting said fats to esters, distilling the resulting esters, partially hydrogenating said distilled esters and saponifying the hydrogenated product.

2. The process of making soap consisting of converting low-grade fats to esters, distilling said esters and saponifying the resulting composition of matter.

Signed at Chicago, Illinois, this 11th day of October, 1923.

JOEL STARRELS.